(12) United States Patent
Adams et al.

(10) Patent No.: US 8,507,839 B2
(45) Date of Patent: Aug. 13, 2013

(54) IMAGE INTENSIFIER TUBE WITH A MOUNTING SURFACE

(75) Inventors: Scott J. Adams, Roanoke, VA (US);
William Eric Garris, Salem, VA (US);
Kevin Schlirf, Winter Haven, FL (US);
Todd Neff, Salem, VA (US)

(73) Assignee: Exelis, Inc., McLean, VA (US)

( * ) Notice: Subject to any disclaimer, the term of this patent is extended or adjusted under 35 U.S.C. 154(b) by 392 days.

(21) Appl. No.: 12/887,904

(22) Filed: Sep. 22, 2010

(65) Prior Publication Data
US 2012/0069433 A1    Mar. 22, 2012

(51) Int. Cl.
*G02B 23/12* (2006.01)

(52) U.S. Cl.
USPC .............................. 250/214 VT; 313/103 CM

(58) Field of Classification Search
USPC ................... 250/214 VT, 239; 313/543, 528, 313/103 CM, 103 R
See application file for complete search history.

(56) References Cited

U.S. PATENT DOCUMENTS

| | | | |
|---|---|---|---|
| 4,733,945 A | 3/1988 | Bacich | |
| 6,040,657 A * | 3/2000 | Vrescak et al. | 313/544 |
| 6,847,027 B2 * | 1/2005 | Iosue | 250/214 VT |
| 7,482,571 B2 | 1/2009 | Thomas | |
| 2007/0103796 A1 | 5/2007 | Floyd | |
| 2010/0149633 A1 | 6/2010 | Brown | |

FOREIGN PATENT DOCUMENTS

| | | |
|---|---|---|
| EP | 2187425 | 5/2010 |
| GB | 1411718 | 10/1975 |

OTHER PUBLICATIONS

International Application Serial No. PCT/US2011/052105, International Search Report and Written Opinion mailed Nov. 25, 2011, 10 pgs.

\* cited by examiner

*Primary Examiner* — Tony Ko
(74) *Attorney, Agent, or Firm* — RatnerPrestia

(57) ABSTRACT

An optical system includes an optical bench defining a mounting surface, an objective lens mounted to the optical bench, and an image intensifier tube. The image intensifier tube includes: (i) a housing defining an interior region and a mounting surface, and (ii) a photocathode bonded to a glass faceplate defining a faceplate surface, wherein the photocathode is positioned within the interior region of the housing, and wherein the mounting surface of the housing resides on the same plane as the faceplate surface. The mounting surface of the optical bench is mounted onto the mounting surface of the image intensifier tube housing such that the mounting surface of the optical bench resides on the same plane as the faceplate surface and the faceplate surface of the faceplate is the surface of the faceplate that is positioned closest to the objective lens.

14 Claims, 9 Drawing Sheets

IMAGE INTENSIFIER TUBE WITH A MOUNTING SURFACE

TECHNICAL FIELD

This invention generally relates to an optical system, an image intensifier tube, and a method of mounting an image intensifier tube to an optical system.

BACKGROUND OF THE INVENTION

An imaging device must be properly aligned within an optical system to meet pre-determined line of sight, image alignment and resolution requirements of the optical system. The optical system may be a camera, camcorder, night vision goggle, or night vision scope, for example. The imaging device may be an image intensifier tube or a digital imaging device, such as a CCD (charge coupled device) or a CMOS (complementary metal oxide semiconductor), for example. Misalignment between the imaging device and its objective lens, caused by a housing of the optical system, results in distortion of an image that is being viewed by the optical system and the user of said system. There is a continuing need to further develop and refine imaging devices, methods for assembling imaging devices, and methods for assembling an imaging device to a housing (or other component) of an optical system to meet line of sight, image alignment and resolution requirements of the optical system.

SUMMARY OF THE INVENTION

According to an aspect of the invention, an optical system comprises an optical bench defining a mounting surface; an objective lens mounted to the optical bench; and an image intensifier tube. The image intensifier tube includes: (i) a housing defining an interior region and a mounting surface, and (ii) a photocathode bonded to a glass faceplate defining a faceplate surface, wherein the photocathode is positioned within the interior region of the housing, and wherein the mounting surface of the housing resides on the same plane as the faceplate surface. The mounting surface of the optical bench is mounted onto the mounting surface of the image intensifier tube housing such that the mounting surface of the optical bench resides on the same plane as the faceplate surface and the faceplate surface of the faceplate is the surface of the faceplate that is positioned closest to the objective lens.

According to another aspect of the invention, an optical system comprises an image intensifier tube including: (i) a housing defining an interior region and a mounting surface, wherein the mounting surface of the housing is configured for mating with a mounting surface of an optical system; (ii) a photocathode bonded to a glass faceplate defining a faceplate surface, wherein the faceplate is positioned within the interior region of the housing; and (iii) a cover mounted to the housing and the faceplate. The mounting surface of the housing resides on the same plane as the faceplate surface.

According to yet another aspect of the invention, a method of assembling an optical system is disclosed. The method includes the steps of: (i) mounting an objective lens on an optical bench adjacent a mounting surface of the optical bench; (ii) mounting a faceplate, including a photocathode bonded thereto, to an image intensifier tube housing such that a mounting surface of the image intensifier tube housing resides on the same plane as a faceplate surface; and (iii) joining the mounting surface of the image intensifier tube housing with the mounting surface of the optical bench such that the mounting surface of the optical bench is substantially coplanar with the faceplate surface, the faceplate surface of the faceplate is the surface of the faceplate that is positioned closest to the objective lens, and an optical axis of the objective lens is substantially perpendicular to the faceplate surface.

These and other aspects of the present invention will become clear from the detailed discussion below when taken into consideration with the drawings. It is to be understood that the following discussion is intended merely to illustrate the preferred embodiments of the present invention. However, the present invention is not limited to the illustrated embodiments, but is limited solely by the claims appended to this specification.

BRIEF DESCRIPTION OF THE FIGURES

The invention is best understood from the following detailed description when read in connection with the accompanying drawing. It is emphasized that, according to common practice, the various features of the drawings are not to scale. Included in the drawing are the following figures.

DETAILED DESCRIPTION OF THE INVENTION

Figure 1A:
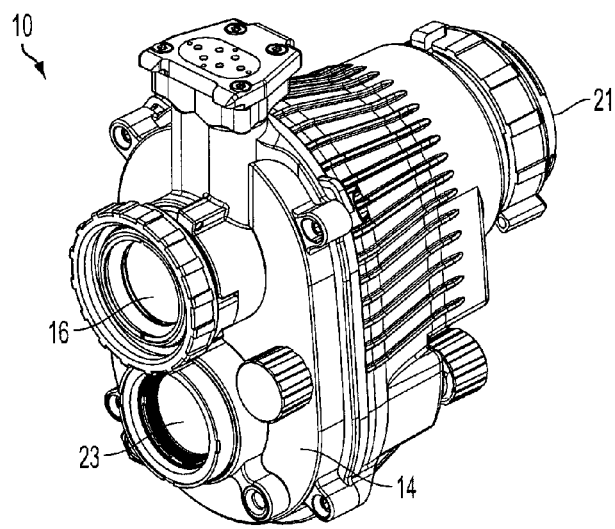
FIGS. 1A-1C depict perspective, front elevation and side elevation views, respectively, of a night vision monocular, according to an exemplary embodiment of the invention.
Figure 1B:
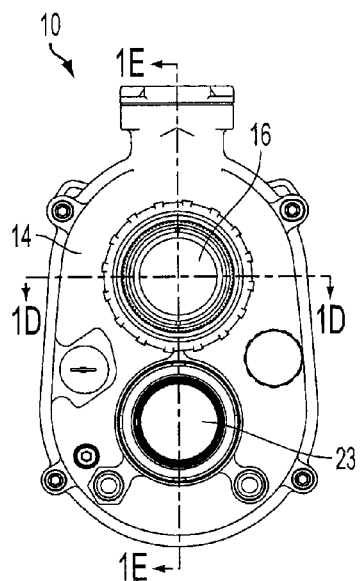
Figure 1C:
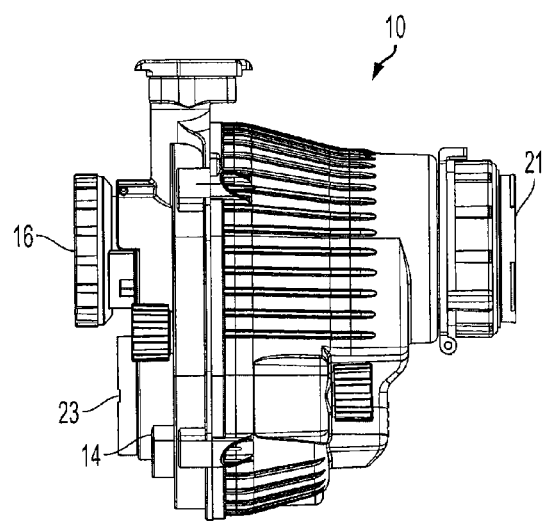
Figure 1D:
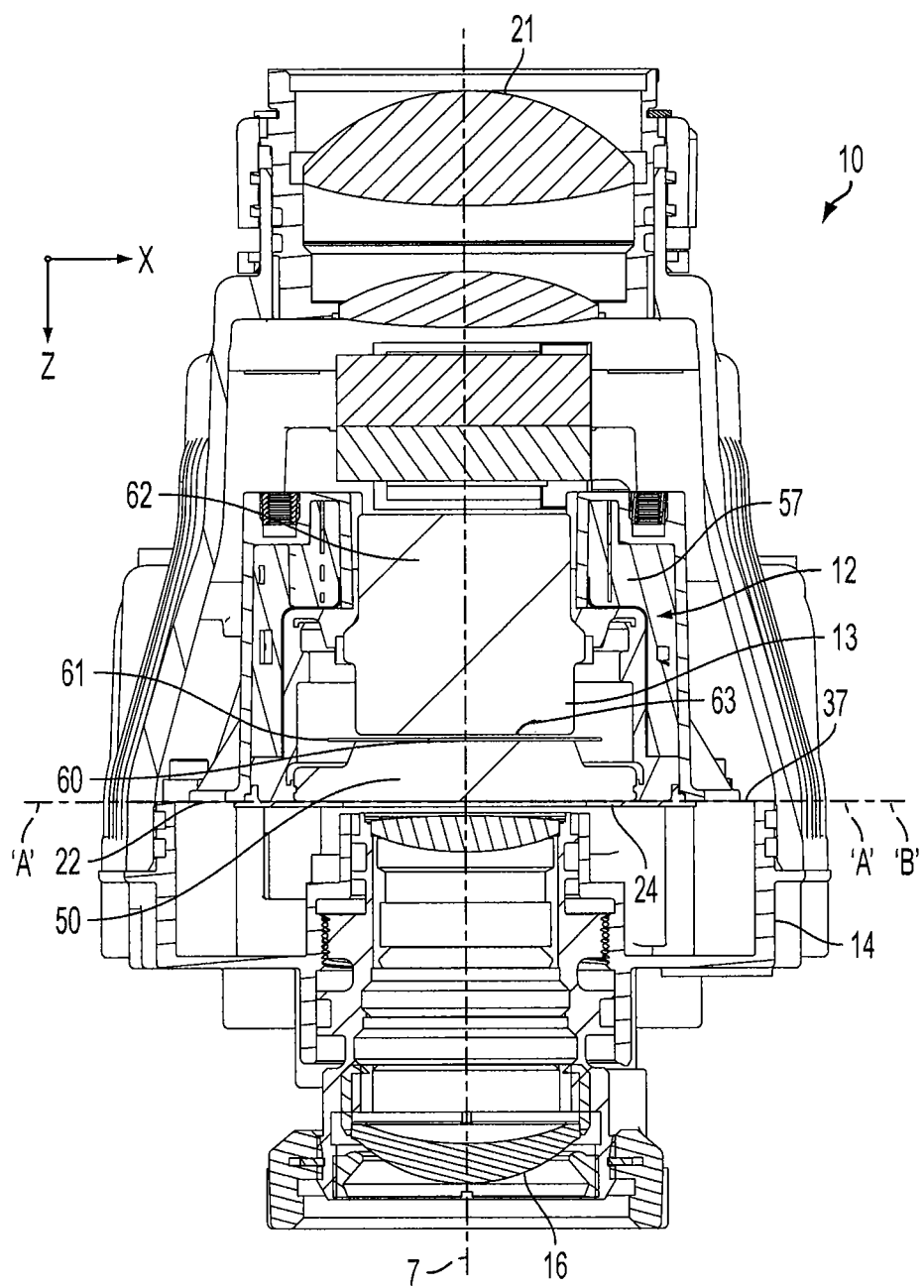
FIG. 1D depicts a cross-sectional view of the monocular of FIG. 1B taken along the lines 1D-1D, wherein several components of the monocular have been omitted.
Figure 1E:
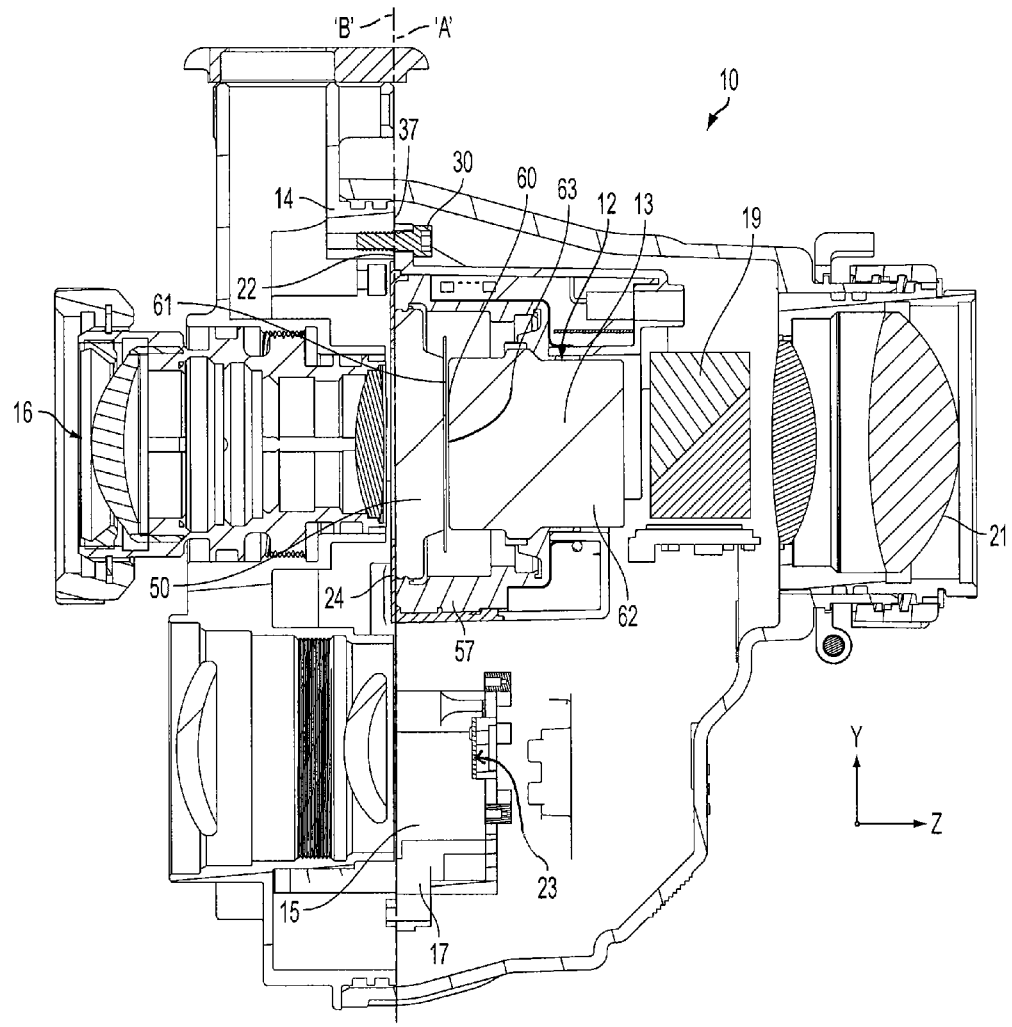
FIG. 1E depicts a cross-sectional view of the monocular of FIG. 1B taken along the lines 1E-1E, wherein several components of the monocular have been omitted.
Figure 2C:
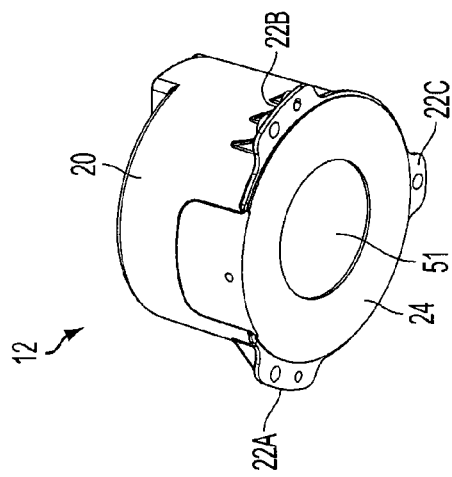
FIGS. 2B and 2C depict top-side and bottom-side perspective views, respectively, of the image intensifier tube assembly of FIG. 2A.
Figure 2B:
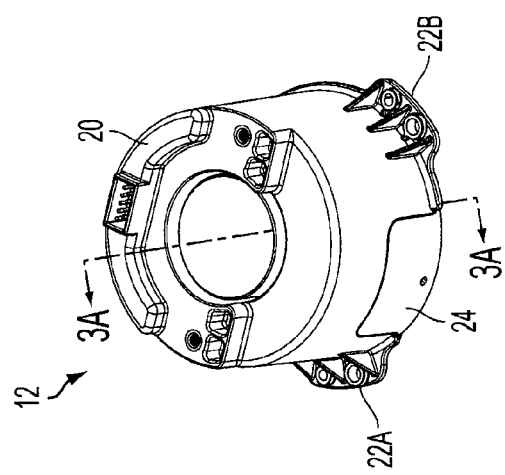
Figure 2A:
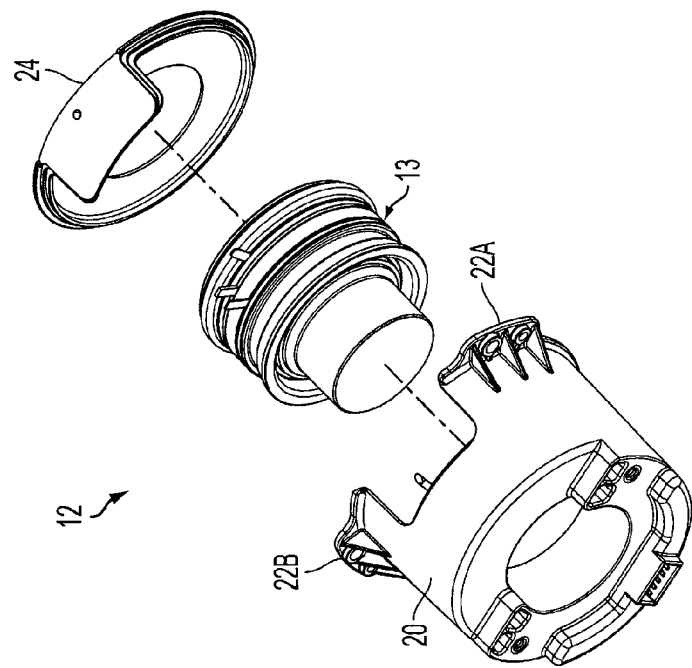
FIG. 2A depicts an exploded view of an image intensifier tube assembly of the monocular of FIGS. 1D and 1E.

FIGS. 1A-1E depict a night vision monocular 10. Monocular 10 includes an objective lens assembly 16, and an infrared focal plane array of an infrared (IR) channel 23, which are each mounted to an optical bench 14. An eyepiece 21 is positioned opposite objective lens assembly 16. As best shown in FIGS. 1D and 1E, an image intensifier tube assembly 12 is mounted to optical bench 14 collinear with objective lens assembly 16. Mounting surface 22 of image intensifier tube assembly 12, which is defined by datum plane 'A', is mounted directly to mounting surface 37 of image optical bench 14, which is defined by datum plane 'B.'

Image intensifier tube assembly 12 includes six basic components mounted within a housing 20, i.e., a glass faceplate 50, a photocathode 61 bonded to the glass faceplate 50, a micro-channel plate (MCP) 60, a phosphor screen 63, a fiber-optic inverter 62, and a power supply 57. The faceplate 50, the photocathode 61, the MCP 60, the phosphor screen 63, and the fiber-optic inverter 62 are assembled together to form an image intensifier tube 13.

Referring now to the operation of monocular 10, the objective lens 16 of monocular 10 collects available light and focuses that light on image intensifier tube assembly 12. The photocathode 61 of image intensifier tube assembly 12, which is positioned closest to objective lens 16, is the image plane and thus detects the light image from objective lens 16 and converts the light image into a corresponding electron pattern. The photocathode 61 is a negatively charged electrode that is coated with a photosensitive compound. When the photocathode 61 is struck by light, the absorbed energy causes electron emission due to the photoelectric effect. The MCP 60 of image intensifier tube assembly 12 amplifies the electron emission. The phosphor screen 63 of the fiber-optic of image intensifier tube assembly 12 transforms the amplified electron emission back to an enhanced light image. The fiber optic inverter 62 of image intensifier tube assembly 12, which is positioned closest to a beam combiner 19, inverts the enhanced light image right side up (the image was previously inverted by objective lens 16). Beam combiner 19 combines the images generated by image intensifier tube 13 and an infrared focal plane array of an infrared (IR) channel 23 into a single fused image.

The single enhanced image is displayed through eyepiece 21 for viewing by a user of monocular 10. Alternatively, the enhanced light image may be digitally presented on a display, which may be a computer monitor or a microdisplay that is positioned before a user's eye, for example. Further details of the basic structure and operation of an image intensifier tube assembly are disclosed in U.S. Pat. No. 7,482,571 to Thomas, which is incorporated by reference herein in its entirety.

FIGS. 2A-2C and 3A depict detailed views of image intensifier tube assembly 12. Image intensifier tube assembly 12 includes image intensifier tube 13 mounted within housing 20, and a cover 24 that is mounted to the bottom end of housing 20. As shown in FIGS. 1D and 1E, mounting surfaces 22A-22C of housing 20 (referred to collectively as mounting surfaces 22) are releasably mounted to optical bench 14 by three fasteners 30 (one fastener shown in FIG. 1E). Cover 24 is mounted to the bottom end of housing 20 at a location that is adjacent mounting surfaces 22 of housing 20. Upon assembling tube assembly 12 into monocular 10, cover 24 does not physically contact optical bench 14.

Figure 3A:
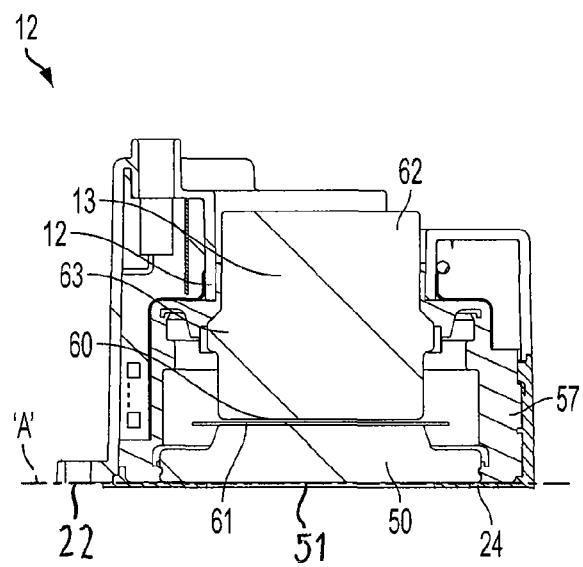
FIG. 3A depicts a cross-sectional view of the image intensifier tube assembly of FIG. 2B taken along the lines 3A-3A.

Referring now to FIG. 3A, the design of image intensifier tube assembly 12 introduces less tilt errors, alignment errors, and displacement errors which degrade line of sight and resolution of monocular 10. To achieve these benefits, faceplate surface 51 of the glass faceplate 50 is positioned on the same datum plane 'A' as the mounting surfaces 22 of image intensifier tube assembly 12. For reference purposes, faceplate surface 51 is the surface of faceplate 50 that is (i) disposed opposite photocathode 61; (ii) exposed through the cover 24 (see FIG. 2C), and (iii) positioned closest to objective lens 16 (see FIG. 1D).

Mounting surfaces 22 of image intensifier tube assembly 12 are mounted directly to mounting pads 37 of optical bench 14, and objective lens 16 is mounted directly to optical bench 14. By virtue of the coplanarity of faceplate surface 51 and mounting surface 22, coupled with the fact that both mounting surface 22 of image intensifier tube assembly 12 and objective lens 16 are mounted directly to optical bench 14, the position of image intensifier tube assembly 12 relative to objective lens 16 can be tightly controlled. This is significant because even slight misalignment between image intensifier tube assembly 12 and objective lens 16 can distort the image that is displayed to the user via eyepiece 21 of monocular 10, or via a microdisplay.

By mounting the display beam combiner 19 directly to the tube screen, the intensifier tube assembly 12 can be front-loaded. Positioning faceplate surface 51 on the same datum plane 'A' as the mounting surface 22 "front-loads" the image intensifier tube assembly 12. Front-loading the image intensifier tube assembly 12 significantly reduces the front end tilt and eliminates the need to "back-load" an image intensifier tube to meet field curvature requirements.

Figure 3B:
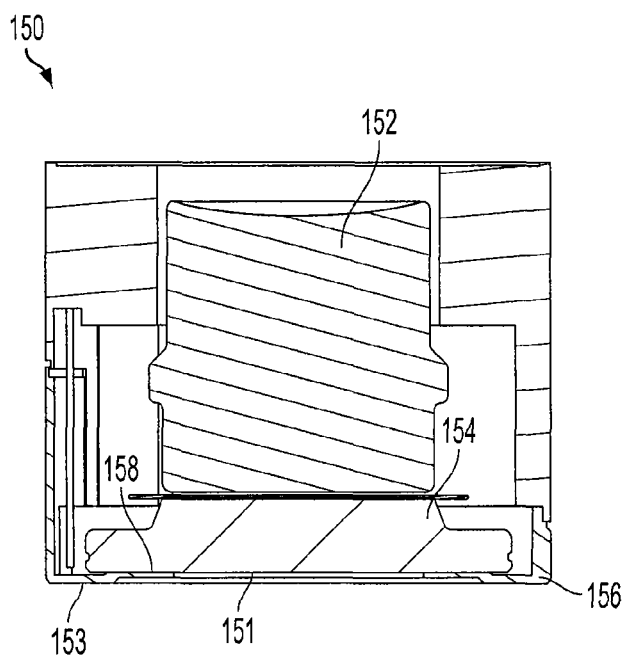
FIG. 3B depicts a cross-sectional view of another image intensifier tube assembly for comparison purposes with the image intensifier tube assembly shown in FIG. 3A.

FIG. 3B depicts a cross-sectional view of another image intensifier tube assembly 150 for the purposes of comparison with the image intensifier tube assembly 12 of FIG. 3A. The image intensifier tube assembly 150 of FIG. 3B is similar to image intensifier tube assembly 12 of FIG. 3A, i.e., both assemblies include an image intensifier tube encased within a housing and a cover mounted to the lower end of the housing. However, in image intensifier tube assembly 150 of FIG. 3B, faceplate surface 151 of image intensifier tube assembly 150 is not coplanar with mounting surface 153 of cover 156. Although not shown, the mounting surface 153 of cover 156 is mounted to an optical bench of an optical system, and an objective lens is also mounted to that optical bench.

The distance separating faceplate surface 151 from optical bench mounting surface 153 varies as a result of the dimensional tolerances of cover 156 as well as the presence of potting material 158 that is distributed between cover 156 and faceplate surface 151. Thus, the position of faceplate surface 151, and, therefore, image intensifier tube 152, can shift due to the presence of potting material 158 and the dimensional variations of cover 156. Such variations cause misalignment between image intensifier tube assembly 150 and the objective lens of the optical system (not shown), which can distort the image that is displayed to the user of the optical system.

Figure 4A:
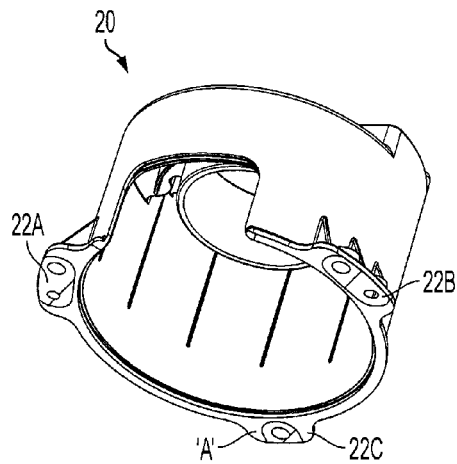
FIGS. 4A and 4B depict bottom-side and top-side perspective views, respectively, of the housing of the image intensifier tube of FIG. 3A.
Figure 4B:
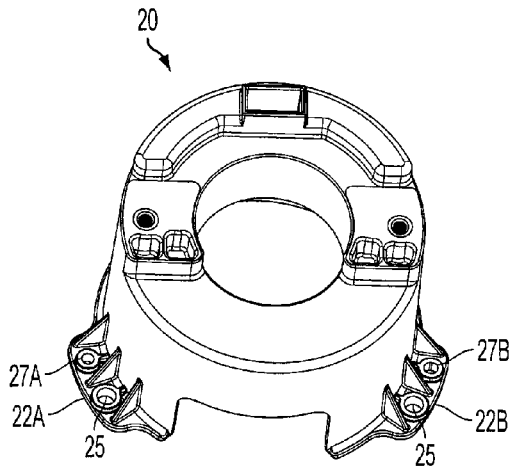
Figure 4C:
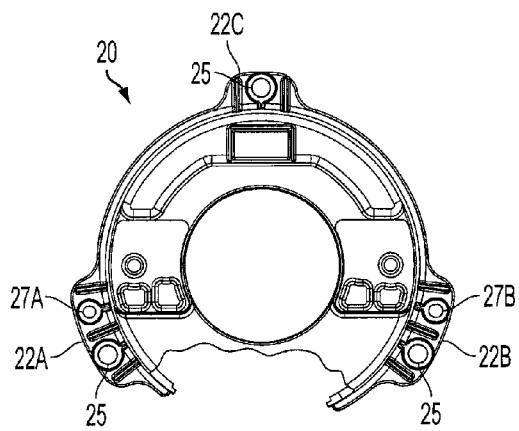
FIG. 4C depicts a segmented top plan view of the housing of FIG. 4A.
Figure 4D:
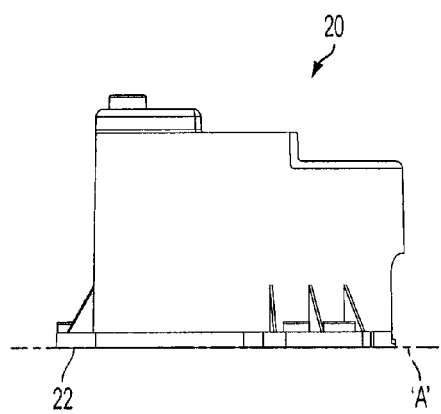
FIG. 4D depicts a side view of the housing of FIG. 4A.

FIGS. 4A-4D depict detailed views of housing 20 of image intensifier tube assembly 12. Housing 20 includes three mounting surfaces 22A, 22B and 22C (referred to collectively as mounting surfaces 22). Each mounting surface 22 extends in a radial direction away from the longitudinal axis of housing 20. As best shown in FIG. 4C, surface 22A defines a thru-hole 25 for receiving a fastener 30 (see FIG. 1E, only one fastener shown) and a circular thru-hole 27A that is sized to just receive an alignment pin 35 (shown in FIG. 5B).

Surface 22B defines a thru-hole 25 for receiving a fastener 30 (see FIG. 1E, only one fastener shown) and an ovular thru-slot 27B that is sized to just receive an alignment pin 35 (shown in FIG. 5B) and is oriented toward the thru-hole 27A. Thru-slot 27B allows for tolerance stack reduction and differing thermal expansion rates without introducing excessive stresses.

Surface 22C defines a thru-hole 25 for receiving a fastener 30, but does not include an hole or slot that is sized to receive an alignment pin.

Figure 5A:
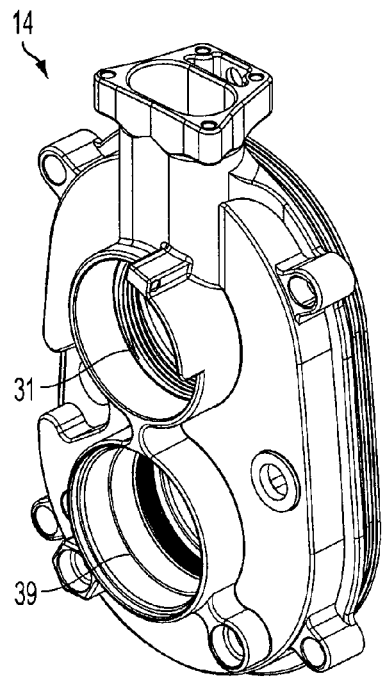
FIGS. 5A and 5B depict front-side and rear-side perspective views, respectively, of an optical bench of the monocular of FIGS. 1A-1E.
Figure 5B:
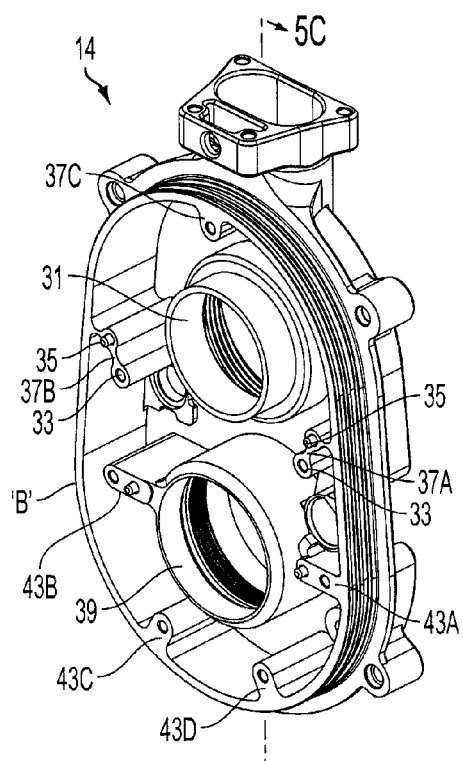
Figure 5C:
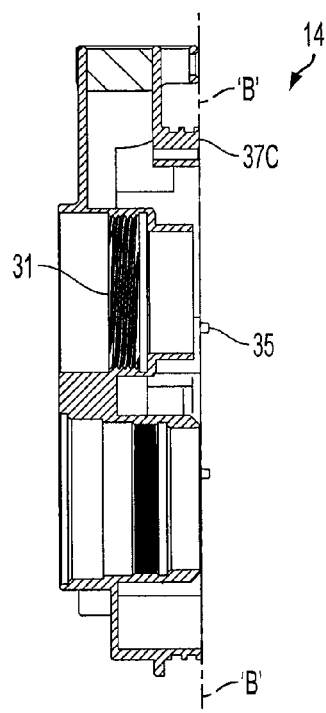
FIG. 5C depicts a cross-sectional view of the optical bench of FIG. 5B taken along the lines 5C-5C.

FIGS. 5A-5C depict detailed views of optical bench 14 of monocular 10. Optical bench 14 includes an objective lens bore 31 for mountably receiving objective lens assembly 16 and a lens bore 39 for mountably receiving another lens assembly for the infrared (IR) channel. The optical bench 14 includes three mounting pads 37A-37C (referred to collectively as pads 37), upon which image intensifier tube assembly 12 is mounted, and four mounting pads 43A-43D upon which an IR camera is mounted. All seven mounting pads (i.e., pads 37A-37C and pads 43A-43D) are coplanar and define datum plane 'B.'

Each image intensifier tube mounting pad 37 includes a threaded hole 33 for receiving a fastener 30 (see FIG. 1E, only one fastener shown). Two alignment pins 35 are fixedly positioned in holes that are defined on mounting pads 37A and 37B. In assembled form of monocular 10, the alignment pin 35 of mounting pad 37A is positioned through thru-hole 27A of housing 20 and the alignment pin 35 of mounting pad 37B is positioned through thru-slot 27B of housing 20 to accurately align the image intensifier tube assembly 12 onto optical bench 14. The alignment pins 35 also act as secondary and tertiary datums for locating objective lens bore 31 in the process of manufacturing the optical bench.

Figure 6A:
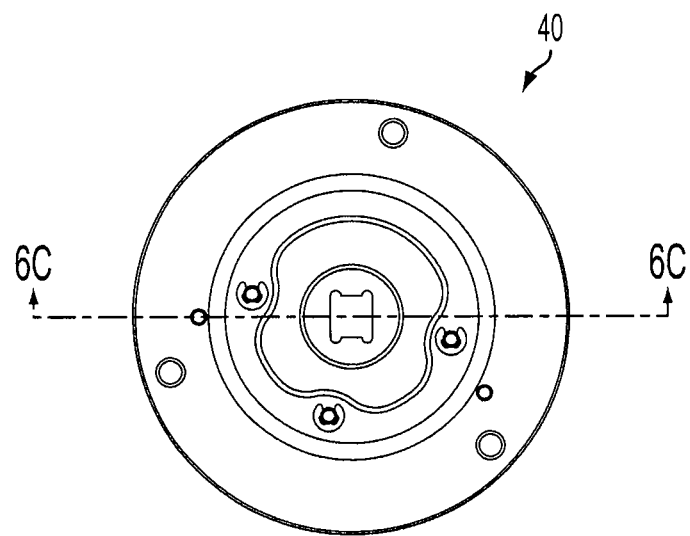
FIGS. 6A and 6B depict top plan and side elevation views, respectively, of a fixture for assembling the image intensifier tube assembly of FIG. 2A.
Figure 6B:
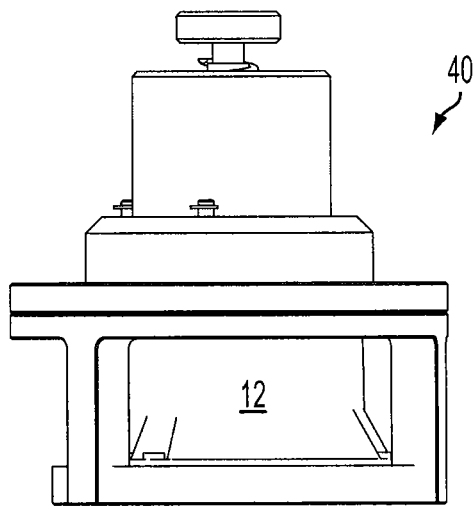
Figure 6C:
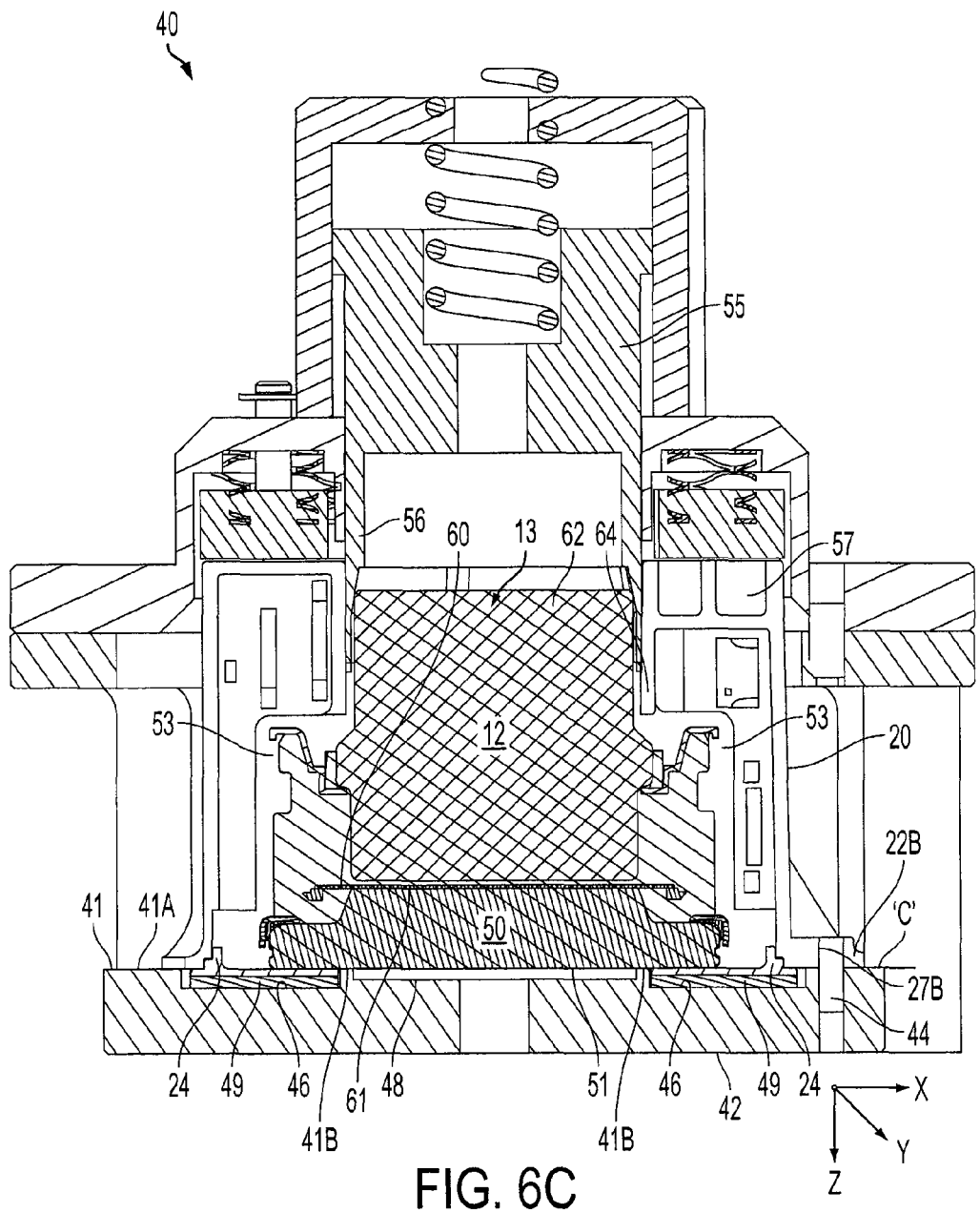
FIG. 6C depicts a cross-sectional view of the fixture of FIG. 6A taken along the lines 6C-6C, wherein the image intensifier tube assembly of FIG. 2A is shown positioned in the fixture.

FIGS. 6A-6C depict a fixture 40 for assembling image intensifier tube assembly 12. Fixture 40 is configured to orient the image intensifier tube 13 along the X, Y and Z axes with respect to image intensifier tube housing 20. As best shown in FIG. 6C, fixture 40 includes a base plate 42 having a top surface 41 defining a datum plane 'C.' Surface 41 consists of two coplanar surfaces which define datum plane 'C', i.e., outer surface 41A supports mounting surfaces 22A-22C of image intensifier tube housing 20 whereas interior surface 41B supports the image intensifier tube faceplate 50.

Two pins 44 (one shown) are fixedly positioned in holes that are defined on outer surface 41A of base plate 42. The pins 44 extend above top surface 41 of base plate 42. The alignment pins 44 are sized to be positioned in thru-hole 27A and thru-slot 27B of image intensifier tube housing 20. Alignment pins 44 control the position of image intensifier tube 13 along the X and Y axes.

An annular recess 46 extends from top surface 41 of base plate 42 to accommodate and support the cover 24 during the potting process. Recess 46 is significant in that it permits mounting surfaces 22 of image intensifier tube housing 20 to reside on the same plane (i.e., datum plane 'C') as faceplate surface 51 of image intensifier tube 13 while accommodating cover 24. Conventional designs, which allow for the distribution of potting material between a cover and a faceplate, may undesirably introduce tilt and displacement to the optical alignment, as previously discussed with reference to FIG. 3B.

Annular recess 46 is sized to receive cover 24 such that cover 24 does not physically contact top surface 41 of base plate 42. In other words, recess 46 permits image intensifier tube cover 24 to reside at an elevation beneath datum plane 'C.' An annular-shaped foam pad 49 is positioned within recess 46 to prevent damage to cover 24 during the process of assembling image intensifier tube assembly 12. Foam pad 49 also limits the distribution of potting material between cover 24 and faceplate 50.

A second recess 48 extends from top surface 41 of base plate 42 to reduce the surface area contact between glass faceplate 50 and top surface 41 of base plate 42, thereby preventing scratches in the active area of image intensifier tube 13. The annular ring that forms interior surface 41B is outside the active area of image intensifier tube 13.

Referring now to an exemplary method of assembling image intensifier tube assembly 12, the faceplate 50, photocathode 61, MCP 60 and fiber optic inverter 62 are joined together by a brazing operation to form image intensifier tube 13 of image intensifier tube assembly 12. The brazed image intensifier tube 13 is then placed inside image intensifier tube housing 20 which contains power supply 57. Image intensifier tube cover 24 is snapped onto image intensifier tube housing 20, thereby encapsulating image intensifier tube 13.

The partially-assembled image intensifier tube assembly 12 is then loaded onto base plate 42 of fixture 40 by positioning pins 44 (see FIG. 6C) of fixture base plate 42 through thru-hole 27A and thru-slot 27B of image intensifier tube housing 20. The mounting surface 22 of image intensifier tube housing 20 and faceplate surface 51 of faceplate 50 are both positioned on surfaces 41A and 41B, respectively, of base plate 42. In other words, mounting surface 22 of image intensifier tube housing 20 and faceplate surface 51 of faceplate 50 are both positioned on datum plane 'C' of base plate 42.

The piston 55 of fixture 40 is driven downwardly toward image intensifier tube assembly 12. The annular segment 56 of piston 55 of fixture 40 is translated into the annular space that separates wall 64 of housing 20 and the cylindrical exterior surface of fiber optic inverter 62. While piston 55 is driven downwardly, the annular segment 56 of piston 55 of fixture 40 aligns image intensifier tube 13 along the X and Y axes (see FIG. 6C for axes) with respect to alignment pins 44 and thru-hole/slot 27 of housing 20. The relative positions of annular segment 56 of piston 55 and alignment pins 44 is closely controlled. An active alignment system (not shown) may be used to move image intensifier tube 13 relative to the thru-hole/slot 27 by using an optical closed feedback loop if tight alignment is required.

The piston 55 also urges image intensifier tube housing 20 and image intensifier tube 13 in a downward Z direction against top surface 41 (i.e., datum plane 'C') such that both mounting surface 22 of image intensifier tube housing 20 and faceplate surface 51 of image intensifier tube assembly 12 are co-planar (i.e., flush) and reside on the same datum plane 'C.'

Potting material is then distributed into cylindrical recess 53 defined between power supply 57, image intensifier tube housing 20, cover 24 and image intensifier tube 13. The potting material is permitted to cure, thereby completing the assembly process of image intensifier tube assembly 12. Although not shown, a small amount of potting material is also distributed between the internal top surface of cover 24 and the faceplate surface 51, however, this potting has no effect on the position of image intensifier tube 13 with respect to mounting surface 22 of housing 20.

Referring back to FIGS. 1D and 1E, once image intensifier tube assembly 12 is potted as described above, it is ready to be mounted to optical bench 14 of monocular 10. Pins 35 of optical bench 14 are slip fit through complimentary thru-hole 27A and thru-slot 27B of housing 20 (or vice versa), such that the longitudinal axis of image intensifier tube assembly 12 is substantially aligned with optical axis 7 (see FIG. 1D) of objective lens 16. The optical bench 14 and image intensifier tube housing 20 are then translated toward each other until mounting surface 22 of image intensifier tube assembly 12 abuts mounting pads 37 of optical bench 14, such that faceplate surface 51 (corresponding to datum plane 'A' in FIGS. 1D and 1E) resides on the same plane as mounting pads 37 of optical bench 14 (corresponding to datum plane 'B' in FIGS. 1D and 1E) and faceplate surface 51 is substantially perpendicular to optical axis 7 of objective lens 16.

The alignment pins 35, thru-hole 27A and thru-slot 27B are each sized to ensure accurate alignment of image intensifier tube assembly 12 with respect to optical bench 14 along the X and Y axes to meet pre-determined resolution and image alignment requirements of monocular 10. A fastener 30 is inserted through each thru-hole 25 of housing 20 and threaded into its complimentary threaded hole 33 to mount image intensifier tube housing 20 (and, thus, image intensifier tube assembly 12) to optical bench 14. The thermal camera bracket 17 is then mounted to mounting pads 43 of optical bench 14 in a similar manner as image intensifier tube assembly 12.

In summation, the location of image intensifier tube 13 with respect to objective lens assembly 16 can be tightly controlled along the X and Y axes because the objective lens bore 31 (in which objective lens 16 is mated) is located with respect to alignment pins 35, the alignment pins 35 are positioned in thru-hole 27A and thru-slot 27B of housing 20, and the image intensifier tube 13 is located with respect to thru-hole 27A and thru-slot 27B of housing 20 (as described with reference to FIG. 6C).

Although the invention is illustrated and described herein with reference to specific embodiments, the invention is not intended to be limited to the details shown. Rather, various modifications may be made in the details within the scope and range of equivalents of the claims and without departing from the spirit of the invention. For example, the details of the invention are not limited to a monocular, and may apply to any optical system, such as, for example, a camera, camcorder, night vision goggle, or a night vision scope.

What is claimed:

1. An optical system comprising:
   an optical bench defining a mounting surface;
   an objective lens mounted to the optical bench; and
   an image intensifier tube including:
   (i) a housing defining an interior region and a mounting surface, and
   (ii) a photocathode bonded to one end of a glass faceplate, and another end of the glass faceplate defining a faceplate surface, wherein the photocathode is positioned within the interior region of the housing, and wherein the mounting surface of the housing resides on the same plane as the faceplate surface,
   wherein the mounting surface of the optical bench is mounted onto the mounting surface of the image intensifier tube housing such that the mounting surface of the optical bench resides on the same plane as the faceplate surface and the faceplate surface of the glass faceplate is the surface that is positioned closest to the objective lens.

2. The optical system of claim 1 further comprising potting material distributed within the interior of the image intensifier tube housing.

3. The optical system of claim 1 further comprising a cover mounted to the image intensifier tube housing.

4. The optical system of claim 1 further comprising an alignment pin mounted to either the optical bench or the image intensifier tube housing, and a hole disposed in the other of the optical bench and the image intensifier tube housing, wherein the hole is sized to receive the alignment pin and the pin and hole are utilized to align the image intensifier tube with respect to the objective lens.

5. The optical system of claim 1 further comprising three fasteners for mounting the image intensifier tube housing to the optical bench.

6. The optical system of claim 1, wherein the faceplate surface and the photocathode are positioned on opposing sides of the glass faceplate.

7. The optical system of claim 1, wherein an optical axis of the objective lens is substantially perpendicular to the faceplate surface.

8. The optical system of claim 1, wherein an optical axis of the objective lens and the image intensifier tube are substantially aligned.

9. An optical system comprising:
   an image intensifier tube including:
   a housing defining an interior region and a mounting surface, wherein the mounting surface of the housing is configured for mating with a mounting surface of an optical system;
   a photocathode bonded to one end of a glass faceplate, and another end of the glass faceplate defining a faceplate surface, wherein the faceplate is positioned within the interior region of the housing; and
   a cover mounted to the housing;
   wherein the mounting surface of the housing resides on the same plane as the faceplate surface of the glass faceplate.

10. The optical system of claim 9 further comprising potting material distributed within the interior of the image intensifier tube housing.

11. The optical system of claim 9, wherein the mounting surface of the housing is flush with the faceplate surface.

12. The optical system of claim 9, wherein the faceplate surface and the photocathode are positioned on opposing sides of the glass faceplate.

13. The optical system of claim 9, wherein the faceplate surface of the glass faceplate is exposed through the cover.

14. A method of assembling an optical system comprising the steps of:
   mounting an objective lens on an optical bench adjacent a mounting surface of the optical bench;
   mounting a glass, faceplate to an image intensifier tube housing such that a mounting surface of the image intensifier tube housing resides on the same plane as a faceplate surface of the glass faceplate; and
   joining the mounting surface of the image intensifier tube housing with the mounting surface of the optical bench such that the mounting surface of the optical bench is substantially coplanar with the faceplate surface of the glass plate, the faceplate surface the surface of the glass plate that is positioned closest to the objective lens, and an optical axis of the objective lens is substantially perpendicular to the faceplate surface.

* * * * *